United States Patent
Wang

(10) Patent No.: US 8,318,850 B2
(45) Date of Patent: Nov. 27, 2012

(54) CURED PERFLUOROELASTOMER ARTICLE

(75) Inventor: Shuhong Wang, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 350 days.

(21) Appl. No.: 12/697,321

(22) Filed: Feb. 1, 2010

(65) Prior Publication Data

US 2010/0216933 A1    Aug. 26, 2010

Related U.S. Application Data

(60) Provisional application No. 61/155,686, filed on Feb. 26, 2009.

(51) Int. Cl.
*C08K 3/04* (2006.01)
(52) U.S. Cl. .......... 524/502; 524/247; 524/366
(58) Field of Classification Search ........... 524/502, 524/366, 247
See application file for complete search history.

(56) References Cited

U.S. PATENT DOCUMENTS

| | | |
|---|---|---|
| 4,214,060 A | 7/1980 | Apotheker et al. |
| 4,281,092 A | 7/1981 | Breazeale |
| 4,394,489 A | 7/1983 | Aufdermarsh |
| 4,983,680 A | 1/1991 | Ojakaar |
| 5,268,405 A | 12/1993 | Ojakaar et al. |
| 5,554,680 A * | 9/1996 | Ojakaar ................. 524/496 |
| 5,789,489 A | 8/1998 | Coughlin et al. |
| 5,789,509 A | 8/1998 | Schmiegel |
| 6,211,319 B1 | 4/2001 | Schmiegel |
| 6,281,296 B1 | 8/2001 | MacLachlan et al. |
| 6,638,999 B2 | 10/2003 | Bish et al. |
| 6,846,880 B2 | 1/2005 | Grootaert et al. |
| 7,381,774 B2 | 6/2008 | Bish et al. |
| 2007/0027260 A1 | 2/2007 | Aufdermarsh et al. |
| 2007/0093608 A1* | 4/2007 | Bish et al. ............. 525/326.2 |

FOREIGN PATENT DOCUMENTS

WO    01/27194 A1    4/2001

OTHER PUBLICATIONS

L.A. Peters, J.C. Vicic, T.L. Pugh, Optimizing Carbon Black Loading for Explosive Decompression Resistance of Fluoroelastomers for Oil Field Service, Rubber World, Nov. 1988, pp. 36-39, vol. 199.

* cited by examiner

*Primary Examiner* — Peter D. Mulcahy
*Assistant Examiner* — Henry Hu

(57) ABSTRACT

Cured perfluoroelastomers that contain high levels (i.e. at least 65 phr carbon black) and 1 to 15 phr of a perfluoropolyether exhibit good resistance to explosive decompression while maintaining good sealing properties.

6 Claims, No Drawings

CURED PERFLUOROELASTOMER ARTICLE

CROSS-REFERENCE TO RELATED APPLICATIONS

This application claims the benefit of U.S. Provisional Application No. 61/155,686 filed Feb. 26, 2009.

FIELD OF THE INVENTION

This invention relates to cured perfluoroelastomer articles, and in particular to the enhancement of the explosive decompression resistance of such articles by incorporation of a high level of carbon black filler and a perfluoropolyether.

BACKGROUND OF THE INVENTION

Perfluoroelastomer articles have achieved outstanding commercial success and are used in a wide variety of applications in which severe environments are encountered, in particular those end uses where exposure to high temperatures and aggressive chemicals occurs. For example, these articles are often used in seals for aircraft engines, in oil-well drilling devices, and in sealing elements for industrial equipment that operates at high temperatures.

The outstanding properties of perfluoroelastomer articles are largely attributable to the stability and inertness of the copolymerized perfluorinated monomer units that make up the major portion of the polymer backbones in these articles. Such monomers include tetrafluoroethylene and perfluoro (alkyl vinyl) ethers. In order to develop elastomeric properties fully, perfluoroelastomer polymers are cured, i.e. crosslinked. To this end, a small percentage of cure site monomer is copolymerized with the perfluorinated monomer units. Cure site monomers containing at least one nitrite group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

Perfluoroelastomer articles that are employed in oil-well drilling devices can be damaged by explosive decompression when the pressure present in deep wells is suddenly released. Cured elastomer articles typically contain small flaws (e.g. voids or regions of low crosslink density). In the high pressure environment experienced by perfluoroelastomer articles employed in oil-well drilling, gasses and other fluids may enter these flaws and reach equilibrium. If the drilling equipment is then depressurized too quickly, expulsion of the gasses and other fluids from the flaws can damage the elastomer articles, causing blisters, ruptures and fractures within the articles and on their surfaces.

Current trends in the Oil and Gas Industry are toward high pressure/high temperature (HPHT) applications which, in addition to resistance to explosive decompression, requires excellent thermal and chemical resistance.

Increasing the hardness of a perfluoroelastomer article by incorporating high levels of fillers can improve the article's resistance to explosive decompression. However, such high hardness articles may be too hard to seal well in high pressure environments.

It would be an improvement to have cured perfluoroelastomer elastomer articles that are both resistant to explosive decompression and which maintain the sealing properties of less hard elastomer articles.

SUMMARY OF THE INVENTION

It has been surprisingly discovered that cured perfluoroelastomer articles that contain a high level of carbon black and a perfluoropolyether have good resistance to explosive decompression while maintaining acceptable sealing properties (e.g. an elongation at break, Eb, greater than 75%).

Accordingly, an aspect of the present invention is directed to a cured perfluoroelastomer article comprising A) a perfluoroelastomer comprising copolymerized units of i) 15 to 60 mole percent perfluoro(alkyl vinyl ether), ii) 0.1 to 5 mole percent of a cure site monomer and the remaining copolymerized units being of iii) tetrafluoroethylene so that total mole percent is 100;

B) 65 to 100 parts by weight, per hundred parts by weight perfluoroelastomer, of carbon black; and C) 1 to 15 parts by weight, per hundred parts by weight perfluoroelastomer, of a perfluoropolyether, wherein said cured perfluoroelastomer article has a hardness (Shore M) of at least 85 and an elongation at break, measured according to ASTM D412-92/D1414, greater than 75%.

DETAILED DESCRIPTION OF THE INVENTION

The perfluoroelastomers employed in the cured articles of the present invention are capable of undergoing crosslinking reactions (i.e. curing) with any of the known curatives for perfluoroelastomers such as, but not limited to organic peroxides and polyfunctional coagents (U.S. Pat. Nos. 4,214,060; 4,983,680), organotin (U.S. Pat. No. 5,789,489), bis (aminophenols) such as diaminobisphenol AF (U.S. Pat. No. 6,211,319 B1), aromatic tetraamines such as 3,3'-diaminobenzidene, ammonia generating compounds such as urea and other compounds (U.S. Pat. No. 6,281,296 and WO 01/27194), guanidines (U.S. Pat. No. 6,638,999) and amidines (U.S. Pat. No. 6,846,880 and U.S. Patent Publication 20070027260). Preferably, the curative employed is either a guanidine or an organic peroxide; Diphenylguanidine phthalate is an especially preferred curative.

Perfluoroelastomers which may be employed in this invention are based on copolymerized units of tetrafluoroethylene (TFE), a perfluoro(alkyl vinyl ether) (PAVE) and a cure site monomer that contains nitrile groups.

Suitable perfluoro(alkyl vinyl ethers) include, but are not limited to those of the formula $$CF_2=CFO(R_fO)_n(R_{f'}O)_mR_{f''} \qquad (I)$$

where $R_f$ and $R_{f'}$ are different linear or branched perfluoroalkylene groups of 2-6 carbon atoms, m and n are independently 0-10, and $R_{f''}$ is a perfluoroalkyl group of 1-6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0-5, and $R_f$ is a perfluoroalkyl group of 1-6 carbon atoms.

A most preferred class of perfluoro(alkyl vinyl) ethers includes those ethers wherein n is 0 or 1 and $R_f$ contains 1-3 carbon atoms. Examples of such perfluorinated ethers include perfluoro(methyl vinyl) ether and perfluoro(propyl vinyl) ether. Other useful ethers include compounds of the formula $$CF_2=CFO[(CF_2)_mCF_2CFZO]_nR_f \qquad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \quad (IV)$$

where m and n=1-10, p=0-3, and x=1-5. Preferred members of this class include compounds where n=0-1, m=0-1, and x=1.

Other useful perfluoro(alkyl vinyl ethers) include $$CF_2=CFOCF_2CF(CF_3)O(CF_2O)_mC_nF_{2n+1} \quad (V)$$

where n=1-5, m=1-3, and where, preferably, n=1.

The perfluoroelastomer further contains copolymerized units of a cure site monomer having nitrite groups. Suitable cure site monomers include nitrile-containing fluorinated olefins and nitrile-containing fluorinated vinyl ethers. Useful nitrile-containing cure site monomers include, but are not limited to those of the formulas shown below.

$$CF_2=CF-O(CF_2)_n-CN \quad (VI)$$

where n=2-12, preferably 2-6;

$$CF_2=CF-O[CF_2-CFCF_3-O]_n-CF_2-CFCF_3-CN \quad (VII)$$

where n=0-4, preferably 0-2;

$$CF_2=CF-[OCF_2CFCF_3]_x-O-(CF_2)_n-CN \quad (VIII)$$

where x=1-2, and n=1-4; and $$CF_2=CF-O-(CF_2)_n-O-CF(CF_3)CN \quad (IX)$$

where n=2-4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

The perfluoroelastomers that may be employed in the cured articles of this invention comprise copolymerized units of i) 15 to 60 (preferably 30 to 50) mole percent perfluoro (alkyl vinyl ether) and ii) 0.1 to 5.0 (preferably 0.3 to 2.0) mole percent nitrile group-containing cure site monomer. The remaining units being tetrafluoroethylene so that the total mole percent is 100. Most preferably the perfluoro(alkyl vinyl ether) is perfluoro(methyl vinyl ether)

Cured perfluoroelastomer articles of this invention also contain between 65 and 100 phr of carbon black. Preferably the perfluoroelastomer articles contain between 75 and 85 phr carbon black. By "phr" is meant parts by weight of ingredient, per hundred parts by weight rubber, i.e. perfluoroelastomer. The carbon black is employed to raise the hardness of the cured perfluoroelastomer article to at least 85 (Shore M or Shore A). A low surface area carbon black, having an iodine adsorption <10, such as N990 (ASTM designation) is preferred. Other blacks may be employed, including blends of carbon blacks.

Cured perfluoroelastomer articles of this invention also contain 1 to 15 (preferably 5 to 10) phr of one or more perfluoropolyethers (PFPE). Perfluoropolyethers suitable for use in this invention include, but are not limited to those of the following formula:

$$CF_3-(O-CF_2CF_2)_n(OCF_2)_m-OCF_3 \quad (XI)$$

$$F-(CF_2CF_2CF_2-O)_p-CF_2CF_3 \quad (XII)$$

$$F-(CF(CF_3)-CF_2-O)_q-CF_2CF_3 \quad (XIII)$$

wherein n, m, p and q are integers between 1 and 180. Preferably m+n=40-180 and n/m=0.5-2. Preferably p and q are integers between 10 and 60. Most preferably, the PFPE is of formula XIII having a kinematic viscosity (ASTM D445) of 3500 cSt at 20° C. The latter is available commercially from DuPont as Krytox® 16350 performance lubricant.

Other additives may be compounded into the perfluoroelastomer to optimize various physical properties. Such additives include stabilizers, lubricants, pigments, fillers (e.g. mineral fillers such as silicas, alumina, aluminum silicate, barium sulfate, titanium dioxide), and processing aids typically utilized in perfluoroelastomer compounding. Any of these additives can be incorporated into the compositions of the present invention, provided the additive has adequate stability for the intended service conditions.

The carbon black, perfluoropolyether, crosslinking agent, and optional other additives are generally incorporated into the perfluoroelastomer by means of an internal mixer or on a rubber mill. The resultant composition is then shaped and cured, generally by means of heat and pressure, for example by compression transfer or injection molding, to form the cured article of the invention. Typically the cured articles are also post cured.

Cured articles of the present invention are useful in production of gaskets, tubing, seals and other molded components.

The invention is now illustrated by certain embodiments wherein all parts and percentages are by weight unless otherwise specified.

EXAMPLES

Test Methods

Physical Properties

The following physical property parameters were recorded on K-214 O-rings; test methods are in parentheses:
$T_b$: tensile strength, MPa (ASTM D412-92/D1414)
$E_b$: elongation at break, % (ASTM D412-92/D1414)
M50: modulus at 50% elongation, MPa (ASTM D412-92/D1414)
Hardness, Shore M (ASTM D412-92/D1414)
Compression Set B (ASTM D395/D1414)

Explosive Decompression Screening

The cured perfluoroelastomer articles subjected to this screening were standard K-315 size O-rings. The test consisted of compressing the K-315 O-ring by 20% and placing it in an autoclave. The gas employed was 100% $CO_2$, only one decompression cycle was performed and the compressed O-ring was not constrained in a groove. Unless otherwise noted, during the test, each O-ring was subjected to 100% $CO_2$ at 15 MPa pressure and 100° C. with a soak time of 24 hours. The test chamber was then depressurized at the rate specified in the Example. After depressurization, each tested O-ring was cut into 4 equal radial sections and the cross-sections were examined for internal cracks under a microscope. For each section, a rating between 0 and 5 was recorded, based on Norsok M-710 rev. 2. A rating of "0" indicated no internal cracks, holes or blisters of any size; "1" indicated <4 internal cracks, each shorter than 50% the diameter of the cross-section, with a total crack length less than the cross-section diameter; "2" indicated <6 internal cracks, each shorter than 50% the diameter of the cross-section, with a total crack length less than 2.5 times the cross-section diameter; "3" indicated <9 internal cracks, of which 2 may have length between 50% and 80% the diameter of the cross-section; "4" indicated >8 internal cracks, one or more cracks longer than 80% the diameter of the cross-section; and "5" indicated at least one crack going through the cross-section or complete separation of the seal into fragments. The rating reported is four numbers, one number for each section of the O-ring, with the highest number listed first. For each perfluoroelastomer composition, two O-rings were tested and the results reported separately.

The perfluoroelastomer (containing copolymerized units of tetrafluoroethylene (TFE), perfluoro(methyl vinyl ether) (PMVE) and 8-CNVE) employed in the Examples was made generally according to the process disclosed in U.S. Pat. No. 5,877,264. It contained 37.4 mole % copolymerized units of perfluoro(methyl vinyl ether) (PMVE), about 0.8 mole percent copolymerized units of 8-CNVE, the remainder being copolymerized units of TFE.

Example 1

Curable compositions were made by compounding the ingredients in a conventional manner on a 2-roll mill. The ingredients and proportions are shown in Table I.

Cured perfluoroelastomer articles were made by molding the curable compositions into K-214 and K-315 O-rings and then curing. Articles of the invention contained the perfluoropolyether (PFPE) Krytox® 16350 (available from DuPont). Comparative articles did not contain PFPE. Comparative Sample A and Sample 1, cured with diphenylguanidine phthalate, were press cured at 199° C. for 9 minutes followed by post cure in an air oven at 290° C. for 4 hours. Comparative Sample B and Sample 2, cured with organic peroxide, were press cured at 177° C. for 12 minutes followed by post cure in an air oven at 200° C. for 4 hours.

Physical properties of cured O-rings and explosive decompression screening were measured according to the Test Methods. Results are shown in Table I.

TABLE I

| | Comp. Sample A | Sample 1 | Comp. Sample B | Sample 2 |
|---|---|---|---|---|
| Formulation, phr | | | | |
| Perfluoroelastomer | 100 | 100 | 100 | 100 |
| N-990 Carbon Black | 75 | 75 | 65 | 65 |
| DPG Phthalate[1] | 1.46 | 1.46 | 0 | 0 |
| Organic Peroxide[2] | 0 | 0 | 4 | 4 |
| Coagent[3] | 0 | 0 | 2 | 2 |
| Perfluoropolyether[4] | 0 | 9 | 0 | 9 |
| Physical Properties | | | | |
| Compression Set, 25%, 200° C., 70 hours, % | 42 | 38 | 54 | 57 |
| Hardness, Shore M | 93 | 91 | 92 | 90 |
| M50, MPa | 12.5 | 8.32 | 14.8 | 9.62 |
| Tb, MPa | 16.9 | 15.8 | 17.5 | 15.0 |
| Eb, % | 77 | 116 | 65 | 88 |
| ED rating | 0000[5] | 1000[5] | 0000[6] | 3100[6] |
| ED rating | 4300[5] | 1000[5] | 3000[6] | 0000[6] |

[1]Diphenyl guanidine phthalate (available from Pfaltz & Bauer, Inc.)
[2]Varox ® DBPH-50-HP (available from R.T. Vanderbilt Co.)
[3]Triallylisocyanurate on silicon dioxide DLC-A 72% (available from Natrochem Inc.)
[4]Krytox ® 16350 (available from DuPont)
[5]ED screening conditions 100° C., 15 MPa, 12 MPa/minute decompression
[6]ED screening conditions 100° C., 15 MPa, 8 MPa/minute decompression

What is claimed is:

1. A cured perfluoroelastomer article comprising
   A) a perfluoroelastomer comprising copolymerized units of i) 15 to 60 mole percent perfluoro(alkyl vinyl ether), ii) 0.1 to 5 mole percent of a cure site monomer having nitrile groups, and the remaining copolymerized units being of iii) tetrafluoroethylene so that total mole percent is 100;
   B) 75 to 85 parts by weight, per hundred parts by weight perfluoroelastomer, of carbon black; and
   C) 1 to 15 parts by weight, per hundred parts by weight perfluoroelastomer, of a perfluoropolyether,
   wherein said cured perfluoroelastomer article has a hardness (Shore M) of at least 85 and an elongation at break, measured according to ASTM D412-92/D1414, greater than 75%.

2. A cured perfluoroelastomer article of claim 1 wherein said perfluoropolyether is selected from the group consisting of i) $CF_3\text{-}(O\text{---}CF_2CF_2)_n(OCF_2)_m\text{---}OCF_3$; ii) $F\text{---}(CF_2CF_2CF_2\text{---}O)_p\text{---}CF_3$; and iii) $F\text{---}(CF(CF_3)\text{---}CF_2\text{---}O)_q\text{---}CF_2CF_3$ wherein n, m, p and q are integers between 1 and 180.

3. A cured perfluoroelastomer article of claim 2 wherein said perfluoropolyether is $F\text{---}(CF(CF_3)\text{---}CF_2\text{---}O)_q\text{---}CF_2CF_3$ having a kinematic viscosity, as measured by ASTM D445, of 3500 cSt at 20° C.

4. A cured perfluoroelastomer article of claim 2 wherein said perfluoropolyether is present at a level between 5 and 10 parts by weight, per hundred parts by weight perfluoroelastomer.

5. A cured perfluoroelastomer article of claim 1 wherein said carbon black has an iodine adsorption <10.

6. A cured perfluoroelastomer article of claim 1 wherein said perfluoroelastomer comprises copolymerized units of i) 30 to 50 mole percent perfluoro(methyl vinyl ether), ii) 0.3 to 2 mole percent of a cure site monomer having nitrile groups, and the remaining copolymerized units being of iii) tetrafluoroethylene so that total mole percent is 100.

* * * * *